UNITED STATES PATENT OFFICE.

ROBERT WAHL, OF CHICAGO, ILLINOIS.

MANUFACTURE OF MALT BEVERAGES.

979,810. Specification of Letters Patent. Patented Dec. 27, 1910.

No Drawing. Application filed September 13, 1909. Serial No. 517,465.

*To all whom it may concern:*

Be it known that I, ROBERT WAHL, a citizen of the United States, residing at Chicago, in the county of Cook and State of Illinois, have invented a new and useful Improvement in the Manufacture of Malt Beverages, of which the following is a specification.

The object of my invention is to provide a process of treating malt beverages for rendering them particularly wholesome and palatable by acidulation with lactic acid fermentation to the exclusion of putrefaction and to the exclusion, particularly, also of any other fermentation, such as alcoholic, butyric, acetic and like fermentations that would tend to defeat my aforesaid object. Lactic acid developed in malt beverages, when the latter are pure and devoid of other ferments, imparts to them an agreeable taste and a peculiarly agreeable flavor, besides rendering them especially wholesome.

To practice my invention I subject the substance to be acidulated to a temperature that will practically destroy or prevent the development in it of any ferment other than that of lactic acid but which will permit development of the bacteria of the latter, which may be supplied to the substance under treatment by adding thereto a suitable quantity of these bacteria, or by merely exposing it to the influence of the surrounding atmosphere while maintaining it at the required temperature.

My invention lies in the discovery of the proper temperature for producing the desired result, which I have found to be 50° C. as best for my purpose, though it may vary from about 46° C. to about 55° C. without departure from the invention.

To produce my improved article of malt-beverage I proceed, in detail, as follows: The malt-wort is prepared in the usual or any suitable manner from malt, with or without the employment of unmalted cereals, whether degerminated or decorticated, or not, and this mash, or the wort taken therefrom (but not hopped or before hopping it, because of the antiseptic properties of the hop-resin) is subjected to a temperature of 50° C., at which lactic-acid bacteria thrive to the exclusion of practically all other organisms. That temperature is maintained until the proper extent of acidulation, of from about one-tenth to about five-tenths per cent. of lactic acid content, has taken place, as may be ascertained by analysis. The process is completed by thereupon cooling the acidulated wort, which may then be carbonated in any known or suitable manner, and which should be subjected to chilling and clarification either before or after carbonating. The beverage may, obviously, be given any desired taste and flavor to suit individual requirement by treating it with hops, juniper-berries or some other condiment or spice. It is essential that the mash or wort be inoculated, while at the prescribed temperature or in the range thereof, with the lactic-acid bacteria, so that after peptonization and starch-inversion have been completed, the liquid must be cooled down to that temperature preparatory to the inoculation by adding to it the supply of lactic acid bacteria or exposing it to the atmosphere for from a few hours to a few days. The addition referred to may be in the form of a small quantity of crushed malt, which quantity may be one-half of one per cent. of the original quantity of malt used for the mash; or the lactic-acid fermentation may be produced by adding to the mash or wort, while at the prescribed temperature, a quantity of acidulated mash or wort from a previous brewing. In fact it is to be recommended that about ten per cent. of each acidulated product be kept for use in each successive treatment. The importance of this lactic-acid fermentation is due to the fact that the mere natural lactic acid introduced into the human system is conducive of better effects than any other acid introduced therein, both as to refreshing influence and taste and as an aid to the processes of digestion; while other acids, such as phosphates, muriatic acid and acetic acid are liable to be more or less harmful to health and are therefore objectionable.

What I claim as new and desire to secure by Letters Patent is—

1. The process of manufacturing a malt-beverage, which consists in mashing malt and acidulating the resultant product by inoculating it with lactic-acid bacteria while maintaining it, until the required extent of acidulation has taken place, at a temperature (46° C. to 55° C., or thereabout) that will promote the fermenting action of said bacteria and prevent practically all other fermentation in the liquid.

2. The process of manufacturing a malt-beverage, which consists in mashing malt, acidulating the resultant wort by inoculating it with lactic-acid bacteria while maintaining it, until the required extent of acidulation has taken place, at a temperature (46° C. to 55° C., or thereabout) that will promote the fermenting action of said bacteria and prevent practically all other fermentation in the liquid, and carbonating the acidulated product.

3. The process of manufacturing a malt-beverage, which consists in mashing malt, acidulating the resultant product by inoculating it with lactic-acid bacteria while maintaining it, until the required extent of acidulation has taken place, at a temperature (46° C. to 55° C., or thereabout) that will promote the fermenting action of said bacteria and prevent practically all other fermentation in the liquid, and hopping the acidulated product.

4. As a new article of manufacture, an extract of malt containing the products of lactic-acid acidulation to the exclusion of the products of substantially all other fermentation.

5. As a new article of manufacture, a carbonated extract of malt containing the products of lactic-acid acidulation to the exclusion of the products of substantially all other fermentation.

6. As a new article of manufacture, a hopped extract of malt containing the products of lactic-acid acidulation to the exclusion of the products of substantially all other fermentation.

7. As a new article of manufacture, a carbonated hopped extract of malt containing the products of lactic-acid acidulation to the exclusion of the products of substantially all other fermentation.

ROBERT WAHL.

In presence of—
  R. A. SCHAEFER,
  L. HEISLAR.